March 30, 1954
D. V. STELLIN
2,673,359
TOOL FOR FORMING RECESSES AND SOCKETS
OF HIGH TORQUE STRENGTH
Filed Jan. 11, 1951
2 Sheets-Sheet 1
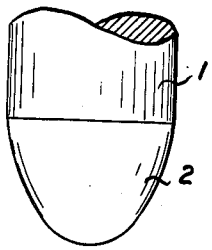
Fig. 1
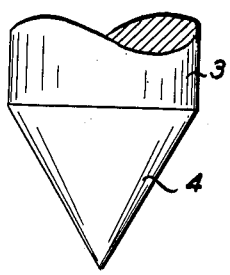
Fig. 2
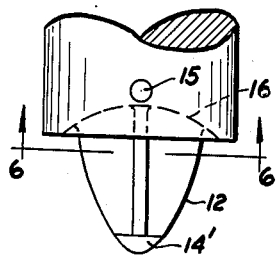
Fig. 4
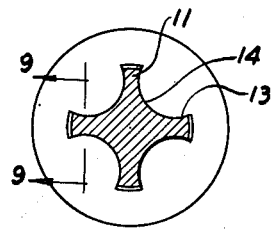
Fig. 6
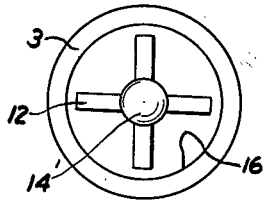
Fig. 7
Fig. 8
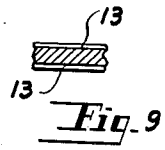
Fig. 9
Fig. 12
Fig. 13
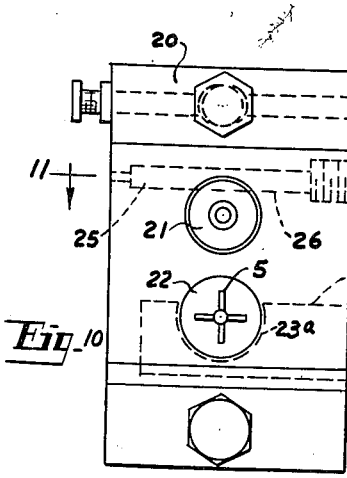
Fig. 10
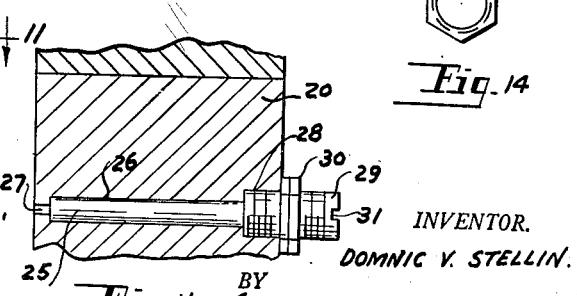
Fig. 14
Fig. 11
INVENTOR.
DOMNIC V. STELLIN.
BY
Samuel Weisman
ATTORNEY.

March 30, 1954     D. V. STELLIN     2,673,359
TOOL FOR FORMING RECESSES AND SOCKETS
OF HIGH TORQUE STRENGTH Filed Jan. 11, 1951     2 Sheets-Sheet 2

INVENTOR:
Domnic V. Stellin,
BY
Orms, McDougall, Williams & Hersh,
ATTORNEYS.

Patented Mar. 30, 1954

2,673,359

UNITED STATES PATENT OFFICE 2,673,359

TOOL FOR FORMING RECESSES AND SOCKETS OF HIGH TORQUE STRENGTH

Domnic V. Stellin, Chicago, Ill.

Application January 11, 1951, Serial No. 205,455

1 Claim. (Cl. 10—7)

This application is a continuation in part of my copending United States application Serial No. 123,184, filed October 24, 1949, now U. S. Patent No. 2,643,142 issued June 23, 1953.

The present invention pertains to punches and particularly for the purpose of forming recesses, sockets, impressions and the like in screws and similar products. For the purpose of simplicity in the description and claim, the recesses and the like will be termed cavities, and the screws and like products will be termed threaded members.

The principal object of this invention is to produce punches which form cavities in threaded members in such a manner as to provide an easy target for a high speed mechanical driver or similar tool. Another object of the invention is to provide punches which form cavities in threaded members in such manner as to enable a driver to disengage quickly and without causing damage to the threaded member at its cavity or the driver itself after the member has been driven home.

A further object of the invention is to provide a punch of the character described with one blow after the head of the member has been pre-formed or roughly formed by an upset punch, without further operations to finish the cavity. Still another object of the invention is to provide punches of the character described which will form recesses of a cross configuration or other shape, by means of a matrix, which will produce a large number of pieces without changes in the tool or breakage of the same.

Finally, a still further object of the invention is to provide a punch of the character described capable of forming a cavity having a high wrenching effect.

With existing equipment there is a considerable breakage or other damage to the driver due to the fact that it does not disengage easily and properly after the threaded member has been driven home. The threaded member may also be damaged at the cavity in such faulty operation.

Also, with present equipment, the driver usually averages 200 pieces, after which the driver bit chips off or breaks, with the result that considerable loss in production and replacement of driver bits becomes a constant and serious problem. This is particularly the case where a large number of driver bits are used constantly on modern assembly lines as in the automotive industry. Many automotive plants keep thousands of these tools on hand because of the excessive damage that is constantly occurring. It is highly desirable to reduce the described damage and thereby reduce the stock of reserve tools, especially in times of scarcity of steel and manpower or competition in the industry. This invention provides the desired remedy by means of a novel punch which forms a cavity so shaped that it reduces damage to the driver bit and to the threaded member.

This cavity or socket is described in detail in my U. S. Patent No. 2,445,978 of July 27, 1948. The cavity includes a number of radially extending pockets which taper in the radial direction, either inwardly or outwardly. There is no tapering in the longitudinal direction or, in other words, the lateral walls of each pocket are equidistant along any plane transverse thereof and parallel to the longitudinal axis of the threaded member.

A threaded member having its cavity formed by means of a punch of the character described herein may be driven satisfactorily by a driver bit of the type now available on the market, with full accomplishment of the described benefits of this invention. This is due to the fact that drivers presently available on the market have a tapering driving vane and therefore do not lock or jam between the described equidistant walls formed by the herein described punch. The equidistant walls, with radial tapering, enable a driver bit to disengage itself quickly and efficiently from a cavity and more easily than a bit which locks and jams in a recess which flares in all directions, as in prior constructions. Locking and jamming of the bit is avoided in the present invention by eliminating the compound angles of present tools and cavities and substituting walls which do not taper up and down but merely in the radial direction to facilitate disengagement of the driver from the cavity. The extreme end walls of the punch may be constructed as in Figures 28 and 29 of my copending application, with a concave formation from end to end to provide strength both in the tool and in the cavity which it produces.

The invention is fully disclosed by way of example in the following description and in the accompanying drawings in which:

Figure 1 is an elevation of the blank;

Figure 2 is an elevation of another form of blank;

Figure 4 is an elevation of another shape of punch;

Figure 6 is a section on the line 6—6 of Figure 4;

Figure 7 is an end view of Figure 4;

Figure 8 is a section on the line 8—8 of Figure 5;

Figure 9 is a section on the line 9—9 of Figure 6;

Figure 10 is a front elevation of the hammer and punch holder;

Figure 11 is a section on the line 11—11 of Figure 10;

Figures 12 and 13 are detail elevations of the locking pin and holding screw, respectively, Figure 14 is an elevation of one of the lock nuts.

Reference to these views will now be made by use of like characters which are employed to designate corresponding parts throughout.

In Figure 1 is shown a blank 1 having a rounded end 2 to be pressed into a matrix in the usual manner to form a tool. This shape is used to form a punch for a deep or large cavity in screws, as in No. 10 truss or larger. This particular type of screw and others may require the rounded end to fill the matrix completely and produce a perfect punch. The rounded end may be spherical or parabolic, commonly known as bullet shaped.

In Figure 2 is shown a blank 3 with a conical end 4 which suffices to form a punch of average dimensions, that is, for the cavity in an average size of screw.

Figure 3:
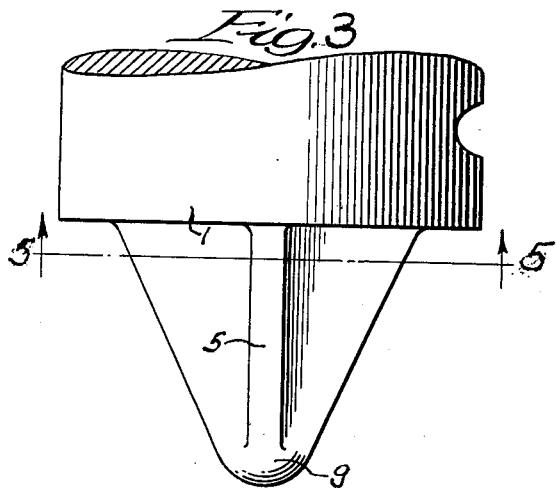
Figure 3 is an elevation of a punch formed from a blank.
Figure 15:
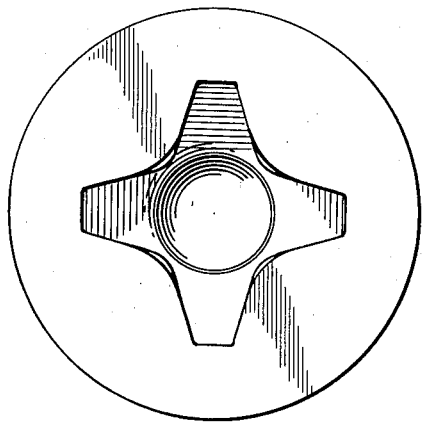
Figure 15 is a top plan view of the recess formed by the tool of Figure 3.

Figures 3 and 4 show two shapes of punches formed from the blanks 1 and 3. It will be understood that the matrices are correspondingly shaped, as disclosed for example in my copending application Serial No. 166,899, filed June 8, 1950, now U. S. Patent 2,638,019 issued May 12, 1953. The shaped end of the body 1 or 3 is pressed in the matrix to form a series of radial vanes 5, usually four in number. The end walls 6 of the vanes in Figure 3 are flat and converge in the downward direction toward the longitudinal axis of the punch. The side walls 7 of each vane diverge radially inward, with respect to each other and are somewhat concave so that the adjacent side walls of successive vanes merge into a common curve 8.

A characteristic of the punch is that there is no convergence or tapering of the side walls 7 of any vane in the longitudinal or axial direction. This is illustrated in Figure 8 which is any transverse section of a vane on a plane parallel to the axis of the punch. In any such plane the walls 7 are parallel to each other.

The vanes terminate somewhat short of the extremity of the punch, and this extremity is shaped as a rounded tip 9 which may be spherical or parabolic, as desired. The unshaped portion of the punch has a chordal or cross recess 10 for a pin that retains the punch in its holder as shown in my copending application Serial No. 123,184, filed October 24, 1949, now U. S. Patent No. 2,643,142, issued June 23, 1953.

In the embodiment shown in Figure 4, the shaped end of the body 1 or 3 is also formed by the matrix into a number of radial vanes 11. The end walls of the vanes are slightly convex as shown in Figure 4. The lateral walls 13 of each vane converge toward the axis, and the adjacent walls of successive vanes merge into a common concave surface 14. The lateral walls 13 of each vane have the equidistant relation, in the longitudinal direction, described in connection with Figure 3. This is illustrated by the sectional view in Figure 9 which is a cross section of any vane in any plane parallel to the longitudinal axis of the punch.

The vanes of this punch also terminate short of the entering extremity which is formed as a rounded tip 14'. The tip may be rounded or parabolic and merges into the convex walls 12 of the vanes.

The unformed body portion 3 has a diametrical hole 15 for the retaining pin, as shown in the art. This hole accomplishes the purpose of the groove or recess 10 in Figure 3. In any shape of punch, either the groove 10 or hole 15 may be used, as desired. Directly above the vanes the body of the punch is formed with a spherical cavity 16 to form a round head on the screw blank. This cavity is merely representative and is shaped in each case according to the style of head to be formed on the screw blank. The flat shoulder 1' in Figure 3 forms a flat head. The back of the punch may be formed as in any of the modifications as shown in my copending application Serial No. 123,184.

The blanks are not limited to the shapes shown in Figures 1 and 2 and may be modified, if necessary, in any manner to assure proper and complete forming of the punch in the matrix. Variations may be made to suit conditions, sizes and types of screws, as far as the blank is concerned.

In Figures 10 and 11 is shown the hammer block or head which carries the pre-forming hammer 21 and one of the described punches shown in Figure 3. An adapter 22 is held in the head as shown in application Serial No. 123,184 and receives the punch 1. The adapter is held in the head by a cylindrical pin 23 inserted in the block 20 and formed with a seat 23a. The exposed threaded end 23' of the pin receives one or more lock nuts 24. The punch is held in the adapter by the usual cylindrical pin received in the groove 10, as well known in the art or in the novel manner shown in said application.

To retain the hammer 8, a cross pin 25 is inserted in a hole 26 in the block 20 and seats in a groove in the wall of the hammer as shown in my copending application Serial No. 123,184. The hole 26 is drilled less than the entire distance through the block 20, and a smaller hole 27 is drilled from the bottom of the hole 26 through the adjacent wall of the block. The inserted pin 25 terminates short of the end of the hole 26 at which it was inserted. This end of the hole 26 is tapped at 28 to receive a threaded plug 29. The plug is of such length that a considerable portion thereof remains outside the block, and on this portion are screwed a pair of lock nuts 30 to hold the plug and the pin firmly seated.

Ordinarily the pin and the plug are in one piece, but in the present case each is a distinct part. Considerable expense in machining is thereby spared since the pin may be standard stock and the plug may be a standard set screw having any desired shape of wrenching end or merely a screwdriver slot.

Again, where the pin and plug are in one piece, the threaded end often snaps off and the pin works loose through the opposite end of the hole which, in such cases, is not reduced but extends entirely through the block. As a result of such separation of the parts, there is considerable damage to the cold heading apparatus and the tools which form the screw head, cavity and body. In the described construction the separate pin 25 obviously cannot work through the smaller hole 27. If, on changing the hammer, the pin is found to be tight in the hole 26, it can be knocked out with a smaller pin inserted in the hole 27.

The described characteristics of the punch shown in Figures 3 and 4 result in a cavity having definite qualities. Among these, as already indicated, are less damage to the threaded member and the driving bit, less frequent replacement of the bit and considerably less loss of operating time. These advantages are due essentially to a better entry of the bit into the cavity, immediate driving on the equidistant walls and the absence of locking and jamming of the bit in the cavity as previously set forth.

Figure 5:
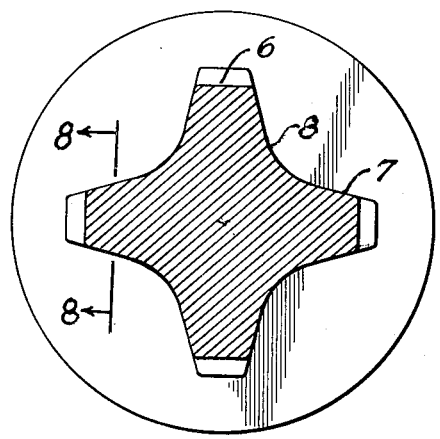
Figure 5 is a section on the line 5—5 of Figure 3.
Figure 16:
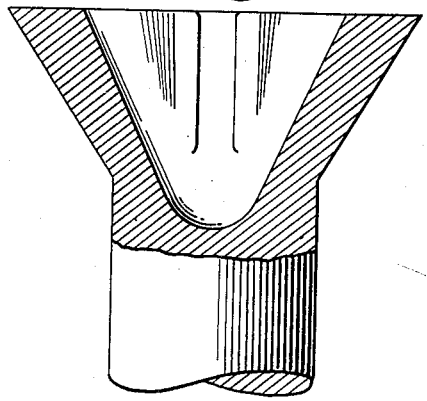
Figure 16 is a sectional elevational view of the recess shown in Figure 15.

Various features of construction herein disclosed may be combined differently than illustrated, and other alterations may be made. For example, the plug 29 may have, instead of the screwdriver slot 31, a square or hexagon head to be held firmly by a wrench while tightening the nuts 30. The hole 15 of Figure 4 and the groove 19 of Figure 3 may be interchanged and used alternatively with a punch having a flat shoulder 1', a round head recess 16 or any other shape of head-forming portion, as well as with either type of vane as shown in Figures 5 and 6. The pin 25 may be of square or rectangular section as well as round. The tip of the punch, described as spherical or parabolic, may also be conical, if desired. The straight end walls 5 or convex end walls 12 of the vanes may be used with either the inwardly tapering vanes of Figure 5 or the outwardly tapering vanes of Figure 6, or with a punch having any particular type of head forming portion.

The principles herein disclosed in connection with a punch may also be applied to a screwdriver or to a gage for measuring recesses or matrices.

Although specific embodiments of the invention have been illustrated and described, it will be understood that various alterations in the details of construction may be made without departing from the scope of the invention as indicated by the appended claim.

What I claim is:

A tool comprising a shank-like body, vanes at one end of said body extending lengthwise and radially of the body, each vane being formed with a pair of side walls and an outer wall, said side walls being spaced an equal distance apart as measured by any plane passed through the vanes parallel to the axis of the shank of the body and perpendicular to the central radial plane of the vane, said side walls being curvilinear in a plane normal to the axis, the opposite walls of each vane in said plane diverging continuously from said respective outer wall for joining with the side walls of adjacent vanes in a continuous curvilinear surface along the entire length of said walls, and in which the outer wall converges gradually toward the longitudinal axis of said body and merges with a shank-like body portion at a point spaced from the end thereof.

DOMNIC V. STELLIN.

References Cited in the file of this patent

UNITED STATES PATENTS

| Number | Name | Date |
|---|---|---|
| 1,366,359 | Clouse | Jan. 25, 1921 |
| 1,476,696 | Deely | Dec. 11, 1923 |
| 2,029,944 | Roddy | Feb. 4, 1936 |
| 2,046,839 | Phillips et al. | July 7, 1936 |
| 2,046,840 | Phillips et al. | July 7, 1936 |
| 2,066,372 | Tomalis | Jan. 5, 1937 |
| 2,082,085 | Tomalis | June 1, 1937 |
| 2,084,078 | Clark | June 15, 1937 |
| 2,125,272 | Erdman | Aug. 2, 1938 |
| 2,129,440 | Olson | Sept. 6, 1938 |
| 2,244,381 | Wilcox | June 3, 1941 |
| 2,268,515 | Olson | Dec. 30, 1941 |

FOREIGN PATENTS

| Number | Country | Date |
|---|---|---|
| 193,135 | Switzerland | Dec. 16, 1937 |